(12) United States Patent
Hundeböl

(10) Patent No.: US 8,146,842 B2
(45) Date of Patent: Apr. 3, 2012

(54) METHOD AND PLANT FOR DRYING AND COMMINUTION OF MOIST, MINERAL, RAW MATERIALS

(75) Inventor: Sören Hundeböl, Mariager (DK)

(73) Assignee: FLSMIDTH A/S, Valby (DK)

( * ) Notice: Subject to any disclaimer, the term of this patent is extended or adjusted under 35 U.S.C. 154(b) by 301 days.

(21) Appl. No.: 12/279,187

(22) PCT Filed: Dec. 28, 2006

(86) PCT No.: PCT/IB2006/055046
§ 371 (c)(1),
(2), (4) Date: Aug. 13, 2008

(87) PCT Pub. No.: WO2007/099415
PCT Pub. Date: Sep. 7, 2007

(65) Prior Publication Data
US 2009/0166452 A1    Jul. 2, 2009

(30) Foreign Application Priority Data

Feb. 28, 2006 (DK) ................. 2006 00279

(51) Int. Cl.
*B02C 23/32* (2006.01)
*B02C 23/24* (2006.01)
(52) U.S. Cl. ............. 241/17; 241/23; 241/24.1; 241/29
(58) Field of Classification Search ............. 241/17, 241/18, 23, 24.1, 29, 80
See application file for complete search history.

(56) References Cited

U.S. PATENT DOCUMENTS

| | | | | |
|---|---|---|---|---|
| 4,728,044 A | * | 3/1988 | Duill et al. | 241/18 |
| 5,005,770 A | * | 4/1991 | Suessegger | 241/19 |
| 5,971,302 A | * | 10/1999 | Doumet | 241/17 |
| 6,264,738 B1 | | 7/2001 | Lorke | |

FOREIGN PATENT DOCUMENTS

CN    1089244 A    7/1994
(Continued)

OTHER PUBLICATIONS

International Search Report.
(Continued)

*Primary Examiner* — Faye Francis
(74) *Attorney, Agent, or Firm* — Jeffrey S. Melcher; Manelli Selter PLLC

(57) ABSTRACT

Provided is a method for drying and comminution of moist, mineral raw materials, including at least one of chalk, marl or clay. The moist, mineral raw material is dried and comminuted in a drier crusher while simultaneously supplying hot gases from a kiln system to form a dried material. The dried material in suspended form is directed to a first separator in which the dried material is separated into a coarse fraction and into a fine fraction. The fine fraction is directed to a separation cyclone and then to the kiln system. The coarse fraction is directed to a dosage means. The dosage means directs a first portion of the coarse material to the drier crusher and a second portion of the coarse material to a separate grinding unit where any hard material components, including at least one of flint, sand or marble, are subjected to grinding to form a ground material. At least a portion of the ground material from the separate grinding unit is supplied to the drier crusher. Also provided is an apparatus for conducting the method.

4 Claims, 1 Drawing Sheet

FOREIGN PATENT DOCUMENTS

| | | |
|---|---|---|
| CN | 1099735 A | 3/1995 |
| CN | 1256173 A | 6/2000 |
| DE | 4340382 A1 | 6/1994 |
| EP | 0610000 A2 | 10/1994 |
| GB | 1577802 A | 10/1980 |

OTHER PUBLICATIONS

First Office Action for corresponding Chinese application dated Apr. 25, 2011.

Chinese Office Action (dated Jan. 5, 2012) in connection with the corresponding Chinese application.

* cited by examiner

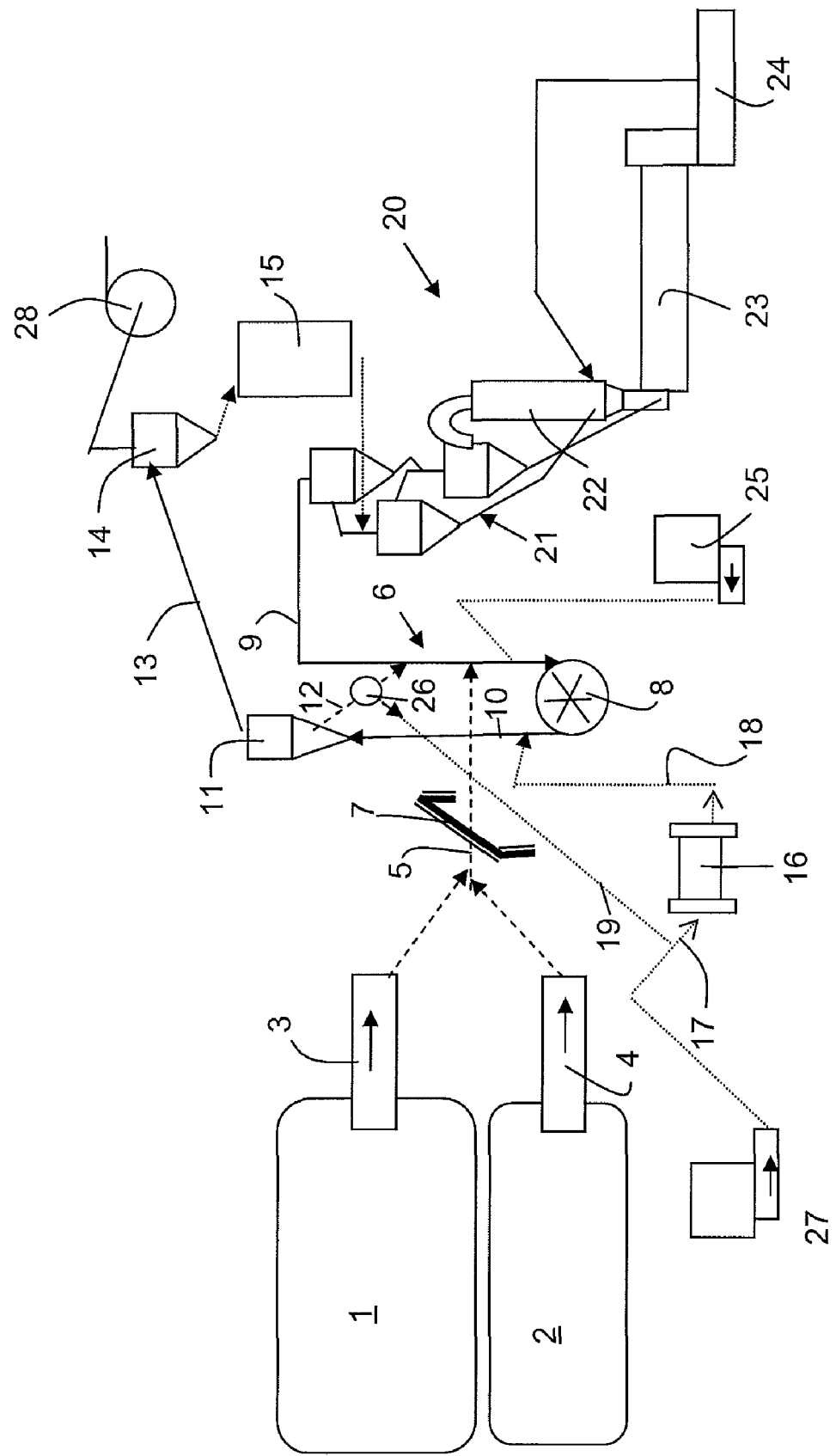

METHOD AND PLANT FOR DRYING AND COMMINUTION OF MOIST, MINERAL, RAW MATERIALS

CROSS-REFERENCE TO RELATED APPLICATIONS

This application is a U.S. national stage entry under 35 U.S.C. 371 of international application No. PCT/IB2006/055046, filed 28 Dec. 2006, designating the United States. This application claims foreign priority under 35 U.S.C. 119 and 365 to Denmark patent application No. PA200600279, filed 28 Feb. 2006.

FIELD OF THE INVENTION

The present invention relates to a method for drying and comminution of moist, mineral raw materials, such as chalk, marl and clay, by which method the raw materials are dried and comminuted subject to simultaneous supply of hot gases in a drier crusher from which the material is subsequently directed in suspended form to a separator in which it is separated into a coarse fraction which is returned to the drier crusher for further drying and comminution and into a fine fraction which is directed to the next stage of the process and where any hard material components such as flint, sand and marble are subjected to grinding in a separate grinding unit. The invention also relates to a plant for carrying out the method.

BACKGROUND OF THE INVENTION

A method as well as a plant of the aforementioned kind is well-known i.a. within the cement manufacturing industry. In actual fact, the method described is used in many cement plants around the world where the available cement raw materials mainly consist of soft and wet materials comprising chalk, marl and clay which do not necessarily require grinding or comminution into smaller particles but being capable of being reduced to the desired fineness in a wash mill without any major complications. In kiln systems of the semi-dry type comprising a drier crusher only a portion of the raw materials is prepared into slurry prior to drying while the material components which are already dry or almost dry are fed directly to the drier crusher. Hence the fuel consumption will be significantly reduced in comparison with situations where all raw materials are prepared into slurry.

These soft raw materials often contain a quantity of hard components in the form of flint, sand, marble and the like. These hard components may take the form of relatively large balls of a size equal to a hen's egg and incapable of being crushed to the desired fineness of less than 100 µm in the drier crusher. Typically, the drier crusher will only be able to break down these hard components to a particle size within the range of 1 to 2 mm. The raw materials may also contain strips of hard, compressed limestone which may also be difficult to comminute in the drier crusher. In cases where the raw materials prior to the drying process in the drier crusher are subjected to comminution in a wash mill, the hard material components may relatively easy be screened out subsequent grinding in a separate grinding unit or for subsequent disposal. The drawback of this method is of course the attendant need for all raw materials to be prepared into slurry in substantial amounts of water which must subsequently be removed, for example by filtration or evaporation.

SUMMARY OF THE INVENTION

It is the object of the present invention to provide a method as well as a plant which will make it possible to use the drier crusher for the drying and comminution of soft and wet raw materials containing a quantity of hard material components without any prior preparation of slurry with addition of extra water.

This is obtained according to the invention by a method of the kind mentioned in the introduction and being characterized in that a part quantity of the coarse fraction from the separator is proportionately fed to the separate grinding unit for the grinding of hard material components.

Hence, it will be possible to substantially reduce the specific energy consumption and the $CO_2$ emission from the kiln system due to the elimination of need prior to drying and comminution in the drier crusher to suspend the raw materials in water which must subsequently be removed. This is ascribable to the fact that the hard material components by the method according to this invention will be drained away from the circuit between the drier crusher and the separator. A further advantage of the method according to this invention is the significant reduction achieved in the wear rate of the drier crusher and its energy consumption. Furthermore, it will be possible to produce a raw meal with excellent burning characteristics due to the reduction in the content of coarse silica particles in the raw meal, which in turn will reduce the $NO_x$ emission from the kiln.

The material which has been ground in the separate grinding unit can be mixed with the fine fraction from the separator, for example in a subsequent homogenizing silo; however, it is preferred that the material is mixed with the material suspension which is directed from the drier crusher to the separator. This will increase the probability of the hard raw materials having the desired degree of fineness and dryness.

The hot gases which are fed to the drier crusher may in principle be constituted by any gases deemed to be appropriate for the purpose. However, in connection with the cement manufacturing process it is preferred that the hot gases be constituted by hot exhaust gases from a subsequent kiln system, possible mixed with hot air extracted from the cooler of the kiln system.

The plant for carrying out the method according to the invention comprises a drier crusher for the drying and comminution of moist, mineral raw materials such as chalk, marl and clay, a source for supply of hot gases to the drier crusher, a duct for transporting the material suspension from the drier crusher to a separator for separating the material suspension into a coarse fraction and a fine fraction, a duct for returning the coarse fraction to the drier crusher for further drying and comminution, a duct for diverting the fine fraction and a separate grinding unit for grinding any hard material components such as flint, sand and marble, and being characterized in that it comprises a dosage means for proportionately feeding a part quantity of the coarse fraction from the separator to the separate grinding unit.

The separate grinding unit may be constituted by any means deemed suitable for grinding hard material components such as those mentioned above, and it may, for example, take the form of a ball mill, roller mill or a roller press. The grinding process may be wet or dry.

BRIEF DESCRIPTION OF THE DRAWING

FIG. 1 illustrates a plant according to the present invention.

DETAILED DESCRIPTION OF THE INVENTION

The invention will now be explained in further details with reference to the drawing, being diagrammatical, its only FIGURE showing a plant for carrying out the method according to the invention.

The plant shown comprises two homogenizing stores 1 and 2 for moist limestone, chalk, marl, clay and similar materials excavated from the quarry, dosage means 3 and 4 for feeding raw materials from the stores 1 and 2 to a belt conveyor 5 which transports the raw materials to a drier crusher installation 6. The plant comprises an analyzer 7 for analyzing the composition of the raw materials and for correcting the dosage means 3 and 4 to allow prior determination of the correct chemistry of the raw materials. The shown drier crusher installation 6 comprises a drier crusher 8 which receives hot exhaust gases from a subsequent kiln system 20 via a duct 9, and a discharge duct 10 which in suspended form conducts the crushed material from the drier crusher 8 to a separator 11. In the separator 11 the material is separated into a coarse fraction which via a duct 12 is returned to the duct 9 and hence the drier crusher for further drying and comminution, and a fine fraction which via a duct 13 is directed to a separation cyclone 14 and an intermediate bin or a homogenizing silo 15. The plant also comprises a separate grinding unit 16, here shown by way of a ball mill, for grinding hard material components, such as flint, sand and marble which are directed to the grinding unit via a duct 17. The material from the grinding unit 16 is routed via a duct 18 to the discharge duct 10 in which it is mixed with the material from the drier crusher and directed to the separator 11. Alternatively, the material from the grinding unit 16 may be diverted in relation to the separator 11 allowing it to be introduced instead into the duct 13 if it can be definitely ascertained that it has the desired degree of fineness and dryness.

The shown kiln system 20 which is not a part of the present invention consists of a traditional kiln system comprising a cyclone preheater 21, a calciner 22, a rotary kiln 23 and a clinker cooler 24 in which the raw materials from the intermediate store 15 in known manner are preheated, calcined, burned into cement clinker and cooled. The gas transport through the rotary kiln 23, the calciner 22, cyclone preheater 21, the drier crusher 8, the separator 11 and the separation cyclone 14 is effected by means of an exhaust gas fan 28.

By way of illustration, the shown plant also comprises a dosage means 25 for introducing dry ingredients such as fly ash and iron oxide into the drier crusher installation 6. The shown plant also comprises a dosage means 27 for hard material components occurring in reasonably pure form, i.e. not encapsulated in the soft raw material components which are introduced via the dosage means 3 and 4. The hard material components are directed to the grinding unit via the duct 17.

According to the invention a part quantity of the coarse fraction which via the duct 12 leaves the separator 11 is proportionately fed by means of a dosage means 26 via a duct 19 to the separate grinding unit 16 in which it is ground together with any hard material components received from the dosage means 27.

The draining away of the hard material components to prevent them from being returned to the drier crusher 6 will significantly reduce the wear rate of the crusher and its energy consumption. Stable operation of the grinding unit 16 will be ensured by proportionately feeding a part quantity of the coarse fraction from the separator 11.

Another advantage is the elimination of the need to prepare the raw materials into slurry in order to separate hard material components prior to the drying and comminution in the drier crusher which will reduce the necessary energy consumption in connection with the subsequent removal of the water, hence reducing also the $CO_2$ emission from the kiln system. Also, it will be possible to produce a raw meal with excellent burning characteristics due to the reduced content of coarse silica particles in the raw meal, which in turn reduces the $NO_x$ emission from the kiln.

The invention claimed is:

1. A method for drying and comminution of moist, mineral raw materials comprising:
    drying and comminuting a moist, mineral raw material in a drier crusher while simultaneously supplying hot gases to form a dried material;
    directing the dried material in suspended form to a separator in which the dried material is separated into a coarse fraction and into a fine fraction;
    directing the fine fraction to a next stage;
    directing the coarse fraction to a dosage means, the dosage means directing a first portion of the coarse material to the drier crusher and a second portion of the coarse material to a separate grinding unit where any hard material components are subjected to grinding to form a ground material; and
    supplying at least a portion of the ground material from the separate grinding unit to the drier crusher, wherein the hot gases comprises hot exhaust gases from a subsequent kiln system.

2. The method according to claim 1, wherein the moist, mineral raw material comprises at least one of chalk, marl or clay.

3. The method according to claim 1, wherein the hard material components comprises at least one of flint, sand or marble.

4. The method according to claim 1, wherein the material which has been ground in the separate grinding unit is mixed with the material suspension which is directed from the drier crusher to the separator.

* * * * *